United States Patent
Takeyama (10) Patent No.: US 8,351,112 B2
(45) Date of Patent: Jan. 8, 2013

(54) OPTICAL AMPLIFIER

(75) Inventor: Tomoaki Takeyama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 195 days.

(21) Appl. No.: 13/017,176

(22) Filed: Jan. 31, 2011

(65) Prior Publication Data

US 2011/0199672 A1   Aug. 18, 2011

(30) Foreign Application Priority Data

Feb. 12, 2010   (JP) .................................. 2010-028441

(51) Int. Cl.
*H01S 3/00* (2006.01)

(52) U.S. Cl. .................. 359/337.4; 359/341.32; 359/349

(58) Field of Classification Search ............... 359/337.4, 359/341.32, 349
See application file for complete search history.

(56) References Cited

U.S. PATENT DOCUMENTS

| | | | |
|---|---|---|---|
| 6,583,925 B1 * | 6/2003 | Delavaux et al. | 359/341.32 |
| 6,934,078 B2 * | 8/2005 | Hwang et al. | 359/341.32 |
| 7,379,236 B2 * | 5/2008 | Masuda et al. | 359/341.32 |

FOREIGN PATENT DOCUMENTS

| | | |
|---|---|---|
| EP | 0 982 881 | 3/2000 |
| JP | 2000-077757 | 3/2000 |

* cited by examiner

*Primary Examiner* — Mark Hellner
(74) *Attorney, Agent, or Firm* — Fujitsu Patent Center (57) ABSTRACT

An optical amplifier includes a first amplification medium to receive light obtained by combining signal light input into an input port and the excitation light generated by a light source; a second amplification medium disposed between the first amplification medium and an output port; a loss medium to receive the signal light separated from light output from the first amplification medium; a variable optical attenuator that is disposed on a path that bypasses the loss medium, and to receive the excitation light separated from the light output from the first amplification medium; a first photodetector to detect power of light separated from the signal light transmitted from the second amplification medium; and a controller to control the amount of attenuation for the variable optical attenuator or output power of the light source so that signal light power per wavelength of the signal light becomes closer to a target value.

11 Claims, 9 Drawing Sheets

FIG. 9

OPTICAL AMPLIFIER

CROSS-REFERENCE TO RELATED APPLICATION

The present application is based upon and claims the benefit of priority of the prior Japanese Patent Application No. 2010-28441, filed on Feb. 12, 2010, the entire contents of which are incorporated herein by reference.

FIELD

The embodiments discussed herein relates to an optical amplifier.

BACKGROUND

With progress of multimedia networks, the demand for communication traffic is rapidly increased. Optical transmission apparatuses for relaying wavelength-division multiplexed (WDM) signal light, which is obtained by combining a plurality of signal lights of different wavelengths, using an optical amplifier that includes a rare-earth-doped optical fiber as an amplification medium play a major role in economizing on communication systems in a multimedia society.

Figure 1:
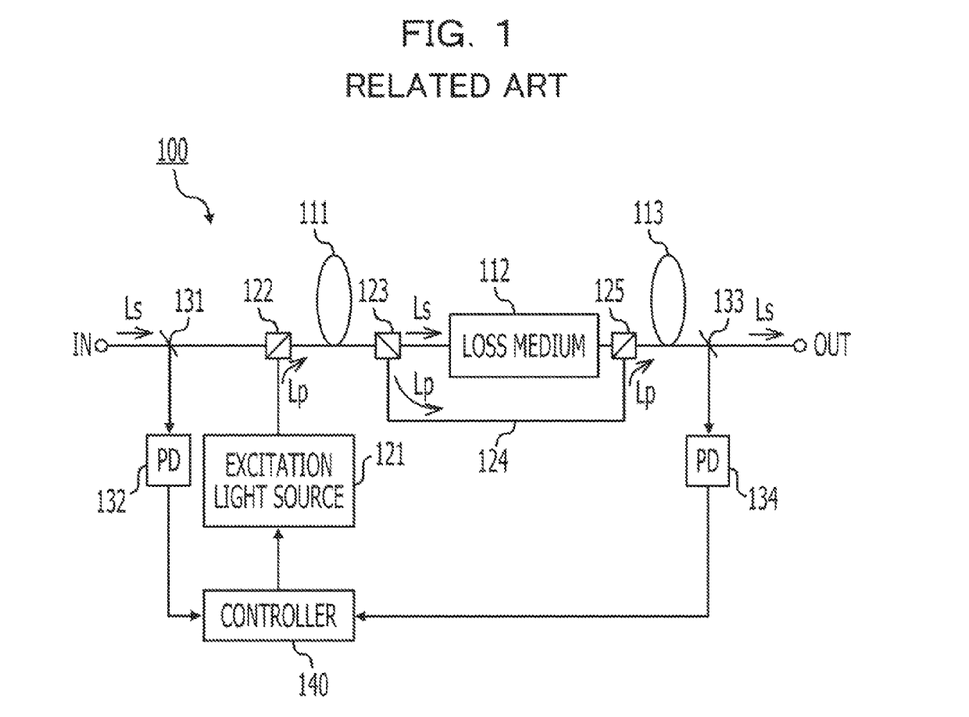
FIG. 1 is a block diagram illustrating an example of an optical amplifier.

FIG. 1 is a block diagram illustrating an example of an optical amplifier. For example, as illustrated in FIG. 1, an optical amplifier for amplifying WDM signal light includes a first erbium-doped fiber (EDF) 111, a loss medium 112 (for example, a gain equalizer or a dispersion compensator), and a second EDF 113 that are optically coupled in series on a signal path between an input port IN and an output port OUT. With the optical amplifier in which the loss medium 112 is disposed between the EDFs 111 and 113, both the degradation in a noise figure (NF) that occurs in an optical amplifier in which a loss medium is disposed at a stage prior to a single EDF and the increase in required excitation light power that occurs in an optical amplifier in which a loss medium is disposed at a stage subsequent to a single EDF can be solved at the same time. Accordingly, the optical amplifier illustrated in FIG. 1 has a configuration efficient for achievement of performance required for optical amplifiers.

Referring to FIG. 1, excitation light Lp is transmitted from an excitation light source 121 to one end of the first EDF 111 via a multiplexer 122. A part of the excitation light Lp that has not been absorbed by the first EDF 111 is leaked out from the other end of the first EDF 111. A path used to transmit the leaked excitation light Lp to the second EDF 113 without attenuating the leaked excitation light Lp in the loss medium 112 is formed. More specifically, a multiplexer 123 disposed between the first EDF 111 and the loss medium 112 transmits the part of the excitation light Lp leaked out from the first EDF 111 to an alternative path 124. The part of the excitation light Lp transmitted through the alternative path 124 is supplied to the second EDF 113 via a multiplexer 125 disposed between the loss medium 112 and the second EDF 113. Thus, by forming a path for excitation light that bypasses the loss medium 112 disposed between the first EDF 111 and the second EDF 113, excitation can be performed on the EDFs 111 and 113 with the excitation light source 121. As a result, the cost reduction of an optical amplifier can be achieved. Such an optical amplifier including an alternative path for excitation light is disclosed in, for example, Japanese Unexamined Patent Application Publication No. 2000-77757 (see, for example, FIG. 5.)

SUMMARY

According to an aspect of an embodiment, an optical amplifier includes a light source configured to generate excitation light; a first amplification medium configured to receive light obtained by combining wavelength-multiplexed signal light input into an input port and the excitation light; a second amplification medium disposed on a signal path between the first amplification medium and an output port; a loss medium that is optically coupled between the first amplification medium and the second amplification medium and is configured to receive the wavelength-multiplexed signal light separated from light output from the first amplification medium; a variable optical attenuator that is optically coupled between the first amplification medium and the second amplification medium, is disposed on an alternative path that bypasses the loss medium, and is configured to receive the excitation light separated from the light output from the first amplification medium; a first photodetector configured to detect power of light separated from the wavelength-multiplexed signal light transmitted from the second amplification medium to the output port; and a controller configured to set the amount of attenuation for the variable optical attenuator in accordance with a wavelength number of the wavelength-multiplexed signal light input into the input port, and control the amount of attenuation for the variable optical attenuator or output power of the light source on the basis of a result of detection performed by the first photodetector so that signal light power per wavelength of the wavelength-multiplexed signal light to be output from the output port becomes closer to a target value set in advance.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will be described in detail below with reference to the accompanying drawings.

Figure 2:
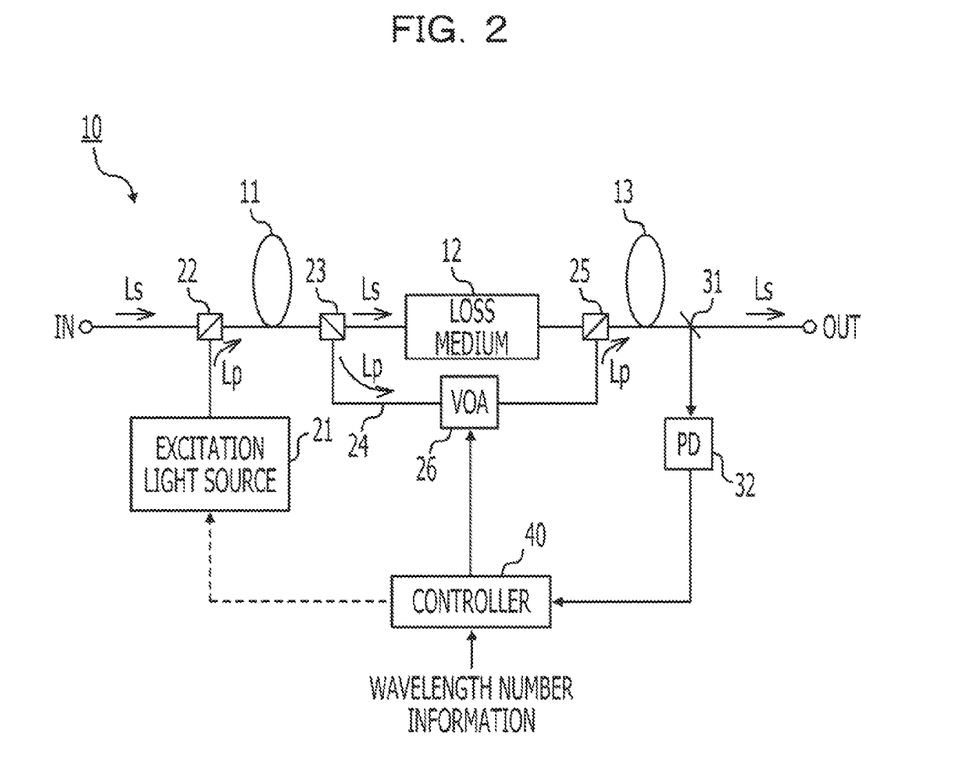
FIG. 2 is a block diagram illustrating an example of an optical amplifier according to a first embodiment of the present invention.

FIG. 2 is a block diagram illustrating an example of an optical amplifier according to a first embodiment of the present invention.

Referring to FIG. 2, an optical amplifier 10 according to the first embodiment includes an input port IN for receiving WDM signal light Ls, an output port OUT for outputting the amplified WDM signal light Ls, a first amplification medium 11, a loss medium 12, and a second amplification medium 13. The first amplification medium 11, the loss medium 12, and the second amplification medium 13 are optically coupled in series on a signal path between the input port IN and the output port OUT. In addition, the optical amplifier 10 includes an excitation light source 21, a multiplexer 22, a demultiplexer 23, an alternative path 24, a multiplexer 25, and a variable optical attenuator (VOA) 26. The excitation light source 21 and the multiplexer 22 are used to supply excitation light Lp to the first amplification medium 11. The demultiplexer 23, the alternative path 24, the multiplexer 25, and the VOA 26 are used to supply a part of the excitation light Lp that has not been absorbed by the first amplification medium 11 to the second amplification medium 13 while bypassing the loss medium 12. In addition, the optical amplifier 10 includes a branching device 31, a photodetector (PD) 32, and a controller 40. The branching device 31 and the PD 32 are used to detect power of the WDM signal light Ls to be output from the output port OUT. The controller 40 is used to control the amount of attenuation for the VOA 26 on the basis of information about a wavelength number of the WDM signal light Ls and a result of detection performed by the PD 32.

Each of the first amplification medium 11 and the second amplification medium 13 is a rare-earth-doped optical fiber (or a rare-earth-doped optical waveguide) obtained by doping an optical fiber (or an optical waveguide) with rare-earth ions. It is desirable that the length of the first amplification medium 11 be shorter than that of the second amplification medium 13. The length of the first amplification medium 11 is set so that the excitation light Lp input from one end of the first amplification medium 11 is not completely absorbed by the first amplification medium 11 and is partly leaked out from the other end of the first amplification medium 11. The length of the second amplification medium 13 is set so that the excitation light Lp supplied thereto is nearly completely absorbed by the second amplification medium 13.

The loss medium 12 is, for example, an optical device for inflicting a loss on input light. The loss medium 12 disposed between the first amplification medium 11 and the second amplification medium 13 is, for example, a gain equalizer for compensating for the wavelength dependence of gains of the first amplification medium 11 and the second amplification medium 13 or a dispersion compensator for compensating for dispersion of the WDM signal light Ls. However, the loss medium 12 is not limited to the above-described example.

The excitation light source 21 generates the excitation light Lp of a specified wavelength capable of exciting rare-earth ions in the first amplification medium 11 and the second amplification medium 13. The excitation light source 21 is driven so that output power of the excitation light Lp is substantially maintained at a value determined in advance, or the driving state of the excitation light source 21 is feedback-controlled in accordance with a signal output from the controller 40. The driving state of the excitation light source 21 will be described in detail later. The multiplexer 22 disposed between the input port IN and the first amplification medium 11 combines the excitation light Lp output from the excitation light source 21 and the WDM signal light Ls input into the input port IN and supplies combined light to one end (optical input terminal) of the first amplification medium 11.

The demultiplexer 23 disposed between the first amplification medium 11 and the loss medium 12 separates light output from the other end (optical output terminal) of the first amplification medium 11 into the WDM signal light Ls and the excitation light Lp in accordance with the wavelength of the light, and transmits the WDM signal light Ls and the excitation light Lp to the loss medium 12 and the alternative path 24, respectively. The multiplexer 25 disposed between the loss medium 12 and the second amplification medium 13 combines the excitation light Lp transmitted from the alternative path 24 and the WDM signal light Ls transmitted from the loss medium 12 and supplies combined light to one end (optical input terminal) of the second amplification medium 13. The VOA 26 is disposed on the alternative path 24 that connects the demultiplexer 23 and the multiplexer 25. The VOA 26 attenuates the excitation light Lp passing through the alternative path 24 in accordance with a variable amount of attenuation. As will be described in detail later, the amount of attenuation for the VOA 26 is set and controlled in accordance with a signal output from the controller 40.

The branching device 31 disposed between the second amplification medium 13 and the output port OUT partly separates light to be transmitted from the other end (optical output terminal) of the second amplification medium 13 to the output port OUT and outputs separated light to the PD 32. The PD 32 detects power of the light separated by the branching device 31 and notifies the controller 40 of a result of the detection.

The controller 40 sets for the VOA 26 the amount of attenuation corresponding to a wavelength number of the WDM signal light Ls input into the input port IN on the basis of externally supplied wavelength number information. The controller 40 obtains signal light power per wavelength of the WDM signal light Ls to be output from the output port OUT on the basis of a branching ratio set for the branching device 31 and light power detected by the PD 32. The controller 40 feedback-controls the amount of attenuation for the VOA 26 or the driving state of the excitation light source 21 so that the signal light power is substantially maintained at a target value set in advance.

In the optical amplifier 10, the WDM signal light Ls input into the input port IN is transmitted to the first amplification medium 11 via the multiplexer 22. The excitation light Lp output from the excitation light source 21 is transmitted to one end of the first amplification medium 11 on the side of the input port IN via the multiplexer 22. The rare-earth ions in the first amplification medium 11 are excited by the excitation light Lp. A part of the excitation light Lp that has not been used for excitation of the first amplification medium 11, that is, a part of the excitation light Lp that has not been absorbed by the first amplification medium 11 and then has been leaked out from the other end of the first amplification medium 11 on the side of the loss medium 12, is transmitted to the alternative path 24 by the demultiplexer 23, and is then supplied to the second amplification medium 13 via the VOA 26 on the alternative path 24 and the multiplexer 25. The rare-earth ions in the second amplification medium 13 are excited by a part of the excitation light Lp that has bypassed the loss medium 12.

The WDM signal light Ls input into one end of the first amplification medium 11 is amplified by the simulated emission operation of excited rare-earth ions, and is then output from the other end of the first amplification medium 11. The WDM signal light Ls amplified by the first amplification medium 11 is input into the loss medium 12 via the demultiplexer 23, is subjected to gain equalization, dispersion compensation, and loss suffering, and is then output from the loss medium 12. The WDM signal light Ls output from the loss medium 12 is input into one end of the second amplification medium 13 via the multiplexer 25, is amplified by the simulated emission operation of excited rare-earth ions, and is then output from the other end of the second amplification medium 13.

A part of the WDM signal light Ls amplified by the second amplification medium 13 is separated by the branching device 31 and is then transmitted to the PD 32. The remaining part of the WDM signal light Ls is externally output from the output port OUT. The PD 32 detects power of the light separated by the branching device 31 and notifies the controller 40 of a result of the detection. The controller 40 sets for the VOA 26 the amount of attenuation corresponding to the wavelength number of input WDM signal light, and performs feedback control on the VOA 26 or the excitation light source 21 on the basis of a result of the detection performed by the PD 32.

The operation of the controller 40 will be described in detail below.

In the optical amplifier 10 in which the WDM signal light Ls input into the input port IN is amplified by the first amplification medium 11 and the second amplification medium 13 and is then output from the output port OUT, in order to set signal light power per wavelength of output WDM signal light to a target value, when a wavelength number of input WDM signal light is changed, the power of the excitation light Lp supplied to the first amplification medium 11 and the second amplification medium 13 is changed. That is, when a wavelength number of input WDM signal light becomes the maximum in an expected range (for example, a range of 1 to 40), the maximum excitation light power is supplied to the first amplification medium 11 and the second amplification medium 13. The excitation light power decreases with the decrease in a wavelength number. The excitation light power supplied to the first amplification medium 11 is changed in accordance with output power of the excitation light source 21. The excitation light power supplied to the second amplification medium 13 is changed in accordance with output power of the excitation light source 21 and the amount of attenuation set for the VOA 26.

On the basis of the above-described characteristics of the optical amplifier 10, the controller 40 sets the amount of attenuation for the VOA 26 to substantially the minimum value (for example, 0) when the wavelength number of input WDM signal light is substantially the maximum. The controller 40 increases the amount of attenuation with the decrease in the wavelength number. The output power of the excitation light source 21 is set so that excitation light power required at the time of the maximum wavelength number is held even if the wavelength number of input WDM signal light is reduced. That is, by increasing the amount of attenuation for the VOA 26 with the decrease in the wavelength number, excitation light power supplied to the first amplification medium 11 is substantially maintained at a level at the time of the maximum wavelength number and excitation light power supplied to the second amplification medium 13 is reduced. As a result, since the excitation light Lp having large power is supplied to the first amplification medium 11 regardless of the change in the wavelength number of input WDM signal light, a population inversion factor around the optical input terminal of the first amplification medium 11 is sufficiently high. Accordingly, NF degradation can be suppressed when the wavelength number is small.

For example, the setting of the amount of attenuation for the VOA 26 is performed as follows. Before the optical amplifier 10 is operated, the amount of attenuation for the VOA 26 is set to substantially the minimum value. In this state, the relationship between the wavelength number of input WDM signal light and the output power (required excitation light power) of the excitation light source 21 required to set signal light power per wavelength of output WDM signal light to a target value is obtained by actual measurement or simulation. Information indicating the relationship is stored in a memory (not illustrated) in the controller 40. After the optical amplifier 10 has been operated, required excitation light power corresponding to a wavelength number represented by wavelength number information supplied to the controller 40 is read from the memory. The difference value between the read required excitation light power and required excitation light power at the time of the maximum wavelength number is obtained. A value obtained by adding the difference value to the minimum value of the amount of attenuation for the VOA 26 is set as the amount of attenuation for the VOA 26 during operation. For example, when the amount of attenuation for the VOA 26 is set to 0 dB at the time of the maximum wavelength number (40 wavelengths), required excitation light power is 24.1 dBm. When required excitation light power at the time of a small wavelength number (1 wavelength) is reduced to 14.0 dBm, the VOA 26 is closed by 24.1 dBm−14.0 dBm=10.1 dB. That is, as the amount of attenuation at the time of 1 wavelength, 10.1 dB is set for the VOA 26.

Figure 3:
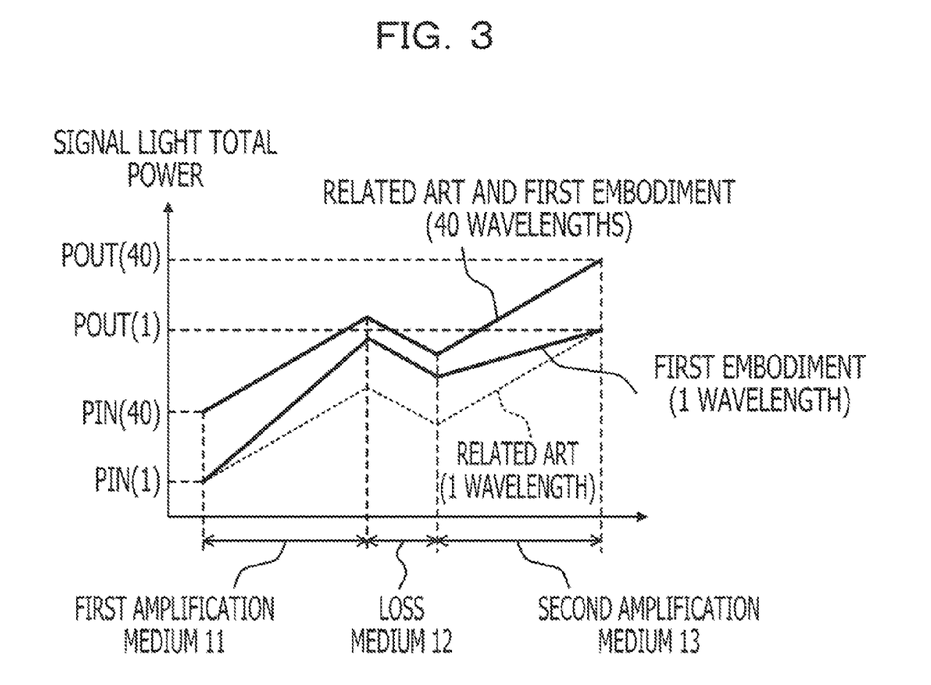
FIG. 3 is a level diagram illustrating an exemplary change in total power of WDM signal light in the optical amplifier illustrated in FIG. 2.

FIG. 3 is a level diagram illustrating an exemplary change in total power of WDM signal light in the optical amplifier illustrated in FIG. 2. FIG. 3 illustrates how total power of the WDM signal light Ls changes when the wavelength number of input WDM signal light is changed from 40 to 1. When the wavelength number is changed from 40 to 1, the total power of the WDM signal light Ls output from the second amplification medium 13 is changed from Pout(40) to Pout(1) even if signal light power per wavelength is held substantially constant. The optical amplifier 100 illustrated in FIG. 1 achieves total power Pout(1) of output WDM signal light by reducing the output power of the excitation light source 121 in accordance with the decrease in a wavelength number. Accordingly, as represented by a broken line in FIG. 3, a level diagram at the time of 1 wavelength is obtained by shifting a level diagram at the time of 40 wavelengths downward.

On the other hand, the optical amplifier 10 illustrated in FIG. 2 achieves total power Pout(1) of output WDM signal light by increasing the amount of attenuation for the VOA 26 in accordance with the decrease in a wavelength number and substantially maintaining the output power of the excitation light source 21 at a level at the time of the maximum wavelength number. Accordingly, in a level diagram at the time of 1 wavelength represented by a solid line in FIG. 3, the gain of the first amplification medium 11 is larger than that of the first amplification medium 11 in a level diagram at the time of 40 wavelengths. A loss that the WDM signal light Ls suffers in the loss medium 12 is substantially constant regardless of the wavelength number. Accordingly, the total power of the WDM signal light Ls input into the second amplification medium 13 is increased in accordance with the increase in the gain of the first amplification medium 11. The increase in the level of WDM signal light input into the second amplification medium 13 improves the effect of the NF of the second amplification medium 13 on the NF of the optical amplifier 10. Therefore, as compared with the NF of the optical amplifier 100 illustrated in FIG. 1, the NF of the optical amplifier 10 at the time of a small wavelength number is markedly improved by a synergistic effect of the increase in a population inversion factor around the optical input terminal of the first amplification medium 11 owing to the increase in excitation light power supplied to the first amplification medium 11 and the increase in the level of WDM signal light input into the second amplification medium 13.

In the above-described method of setting the amount of attenuation for the VOA 26, the relationship between the wavelength number of WDM signal light and required excitation light power is obtained by actual measurement or simulation performed in a state in which the amount of attenuation for the VOA 26 is set to substantially the minimum value. The required excitation light power does not have a value reflecting the effect of the increase in the gain of the first amplification medium 11 which is caused by increasing the amount of attenuation for the VOA 26 in accordance with the decrease in a wavelength number. Accordingly, the signal light power per wavelength of output WDM signal light achieved when the amount of attenuation at the time of a small wavelength number is calculated using the above-described relationship and is then set for the VOA 26 may deviate from a target value. In order to compensate for an error, the controller 40 obtains actual signal light power per wavelength of output WDM signal light on the basis of a result of detection performed by the PD 32. The controller 40 performs feedback control of the amount of attenuation for the VOA 26 or feedback control of the driving state of the excitation light source 21 so that signal light power is substantially maintained at a target value.

When the controller 40 performs feedback control of the amount of attenuation for the VOA 26, required excitation light power at the time of the maximum wavelength number is held in the excitation light source 21 regardless of the change in the wavelength number of input WDM signal light. The amount of attenuation that has been set for the VOA 26 in accordance with a wavelength number using the above-described relationship is enhanced on the basis of a result of detection performed by the PD 32 so that signal light power per wavelength of output WDM signal light is set to a target value. When the controller 40 performs feedback control of the driving state of the excitation light source 21, the amount of attenuation for the VOA 26 is set to a value corresponding to a wavelength number using the above-described relationship. The driving state of the excitation light source 21 is enhanced on the basis of a result of detection performed by the PD 32 so that signal light power per wavelength of output WDM signal light is set to a target value.

In the above-described feedback control, the response speed of the excitation light source 21 is higher than that of the VOA 26. When the accuracy of signal light power per wavelength of output WDM signal light is important, it is desirable that feed back control be performed on the excitation light source 21 on the basis of a result of detection performed by the PD 32. Since the feedback control performed on the excitation light source 21 is similar to automatic gain control (AGC) or automatic level control (ALC) performed in optical amplifiers, the feedback control can be easily performed. On the other hand, when the feedback control is performed on the VOA 26 on the basis of a result of detection performed by the PD 32, the excitation light source 21 can be stably driven. The configuration of the optical amplifier 10 can be therefore simplified.

In the optical amplifier 10 according to the first embodiment, when the excitation light Lp leaked out from the first amplification medium 11 is supplied to the second amplification medium 13 without being passed through the loss medium 12 disposed between the first amplification medium 11 and the second amplification medium 13, the VOA 26 is disposed on the alternative path 24 for the excitation light Lp. The amount of attenuation for the VOA 26 is set in accordance with a wavelength number of input WDM signal light. The signal light power per wavelength of output WDM signal light is monitored so as to perform feedback control of the amount of attenuation for the VOA 26 or feedback control of the driving state of the excitation light source 21. As a result, regardless of the change in the wavelength number of input WDM signal light, it is possible to amplify WDM signal light with a high degree of excitation efficiency while holding a good NF of the optical amplifier.

Figure 4:
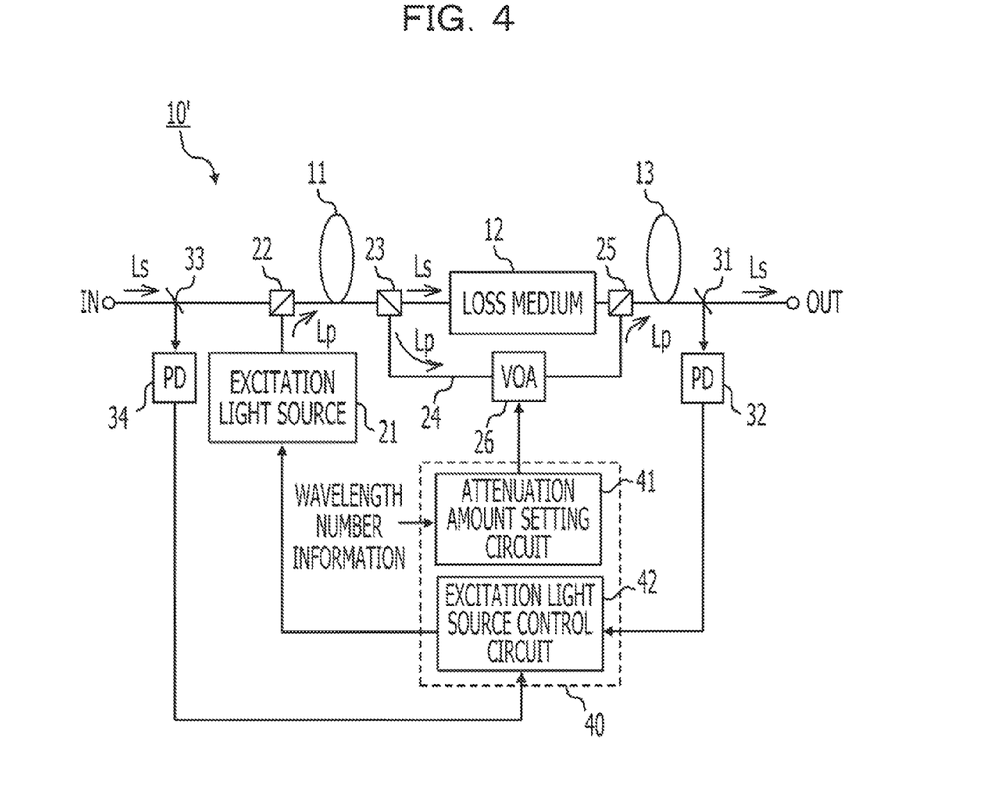
FIG. 4 is a block diagram illustrating an example of an optical amplifier according to a second embodiment of the present invention.

Next, an optical amplifier according to a second embodiment of the present invention will be described. FIG. 4 is a block diagram illustrating an example of an optical amplifier according to the second embodiment. In FIG. 4 and other drawings, the same reference numerals are used for components having substantially the same functions as those of FIG. 2.

As illustrated in FIG. 4, an optical amplifier 10' according to the second embodiment includes an attenuation amount setting circuit 41, an excitation light source control circuit 42, a branching device 33, and a photodetector (PD) 34 in addition to the components illustrated in FIG. 2. The attenuation amount setting circuit 41 and the excitation light source control circuit 42 are included in the controller 40. The branching device 33 and the PD 34 are used to detect the power of the WDM signal light Ls input into the input port IN.

The attenuation amount setting circuit 41 acquires information about the wavelength number of the WDM signal light Ls input into the input port IN of the optical amplifier 10' using a supervisory control signal transmitted between an optical transmission apparatus (not illustrated) including the optical amplifier 10' and another optical transmission apparatus. As described previously, the attenuation amount setting circuit 41 calculates the difference value between required excitation light power at the time of the maximum wavelength number and required excitation light power corresponding to a wavelength number indicated by the wavelength number information. The attenuation amount setting circuit 41 adds the difference value to the minimum value of the amount of attenuation for the VOA 26 and sets a result of the addition as the amount of attenuation for the VOA 26.

The branching device 33 disposed between the input port IN and the first amplification medium 11 inputs a part of light transmitted from the input port IN to the first amplification medium 11 into the PD 34. The PD 34 detects the power of the light separated by the branching device 33 and notifies the excitation light source control circuit 42 of a result of the detection.

The excitation light source control circuit 42 computes the gain of the optical amplifier 10' on the basis of light power detected by the PD 34 on the input side and light power detected by the PD 32 on the output side, and performs feedback control of the driving state of the excitation light source 21 so that the gain is substantially maintained at a target gain set in advance. The excitation light source control circuit 42 performs feedback control on the excitation light source 21, so that, even if the wavelength number of input WDM signal light is changed, signal light power per wavelength of the WDM signal light Ls output from the output port OUT is substantially maintained at a target value.

In the optical amplifier 10', the amount of attenuation, which has been calculated by the attenuation amount setting circuit 41 on the basis of the wavelength number information, is set for the VOA 26, and is updated each time a wavelength number indicated by the wavelength number information changes. The control of the amount of attenuation for the VOA 26 performed by the attenuation amount setting circuit 41 and the feedback control of the excitation light source 21 performed by the excitation light source control circuit 42 can be separately performed.

Figure 5A:
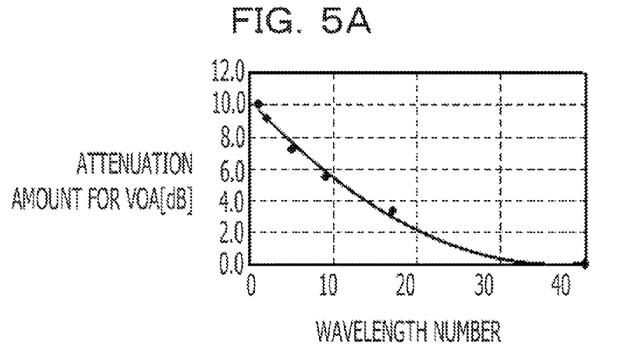
FIG. 5A is a diagram illustrating an example of the amount of attenuation for a variable optical attenuator in the optical amplifier illustrated in FIG. 4.
Figure 5B:
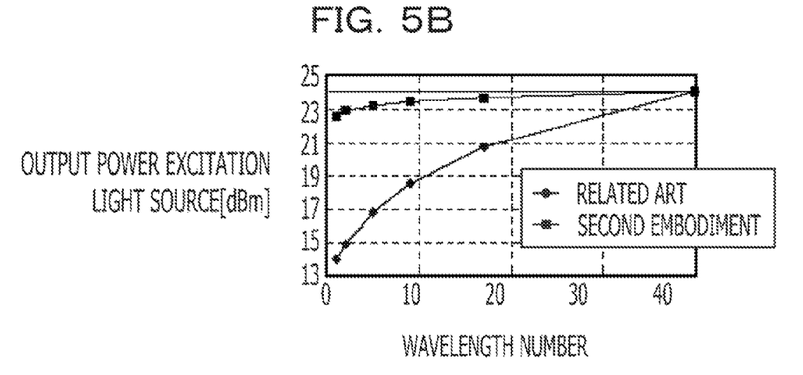
FIG. 5B is a diagram illustrating an example of the output power of an excitation light source in the optical amplifier illustrated in FIG. 4.
Figure 5C:
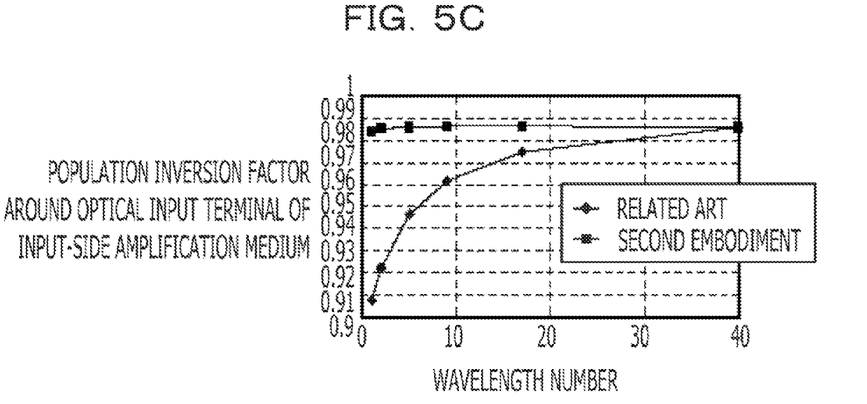
FIG. 5C is a diagram illustrating an exemplary population inversion factor around the optical input terminal of a first amplification medium in the optical amplifier illustrated in FIG. 4.

FIG. 5A is a diagram illustrating an example of the amount of attenuation for a VOA in the optical amplifier illustrated in FIG. 4. FIG. 5B is a diagram illustrating an example of the output power of an excitation light source in the optical amplifier illustrated in FIG. 4. FIG. 5C is a diagram illustrating an exemplary population inversion factor around the optical input terminal of a first amplification medium in the optical amplifier illustrated in FIG. 4. FIG. 5A is a graph illustrating an example of the amount of attenuation for the VOA 26 that is set by the attenuation amount setting circuit 41 in accordance with a wavelength number. In this example, at the time of the maximum wavelength number (40 wavelengths), the amount of attenuation for the VOA 26 is set to 0 dB. With the decrease in the wavelength number, the amount of attenuation for the VOA 26 increases. When the wavelength number is 1, the amount of attenuation for the VOA 26 is set to 10.1 dB. It is assumed that signal lights whose wavelength numbers range from 1 to 40 are arranged at intervals of 100 GHz in a C wavelength band in the WDM signal light Ls, input signal light power per wavelength is set to −20.4 dBm/ch, and output signal light power per wavelength is set to 2.5 dBm/ch. As the first amplification medium 11, an erbium-doped fiber (EDF) having a length of 5.5 m is used. As the second amplification medium 13, an EDF having a length of 15.5 m is used. The wavelength of light output from the excitation light source 21 is set to 0.98 μm.

By setting the amount of attenuation for the VOA 26 on the basis of the wavelength number information as described previously, like in the optical amplifier 10 illustrated in FIG. 2, the excitation light Lp output from the excitation light source 21 is supplied to the first amplification medium 11 and the second amplification medium 13. The WDM signal light Ls passes through the first amplification medium 11 and the second amplification medium 13, so that the WDM signal light Ls is amplified. The input power of the WDM signal light Ls is detected by the PD 34 on the input side. The output power of the WDM signal light Ls is detected by the PD 32 on the output side. Results of the detection are transmitted to the excitation light source control circuit 42. The excitation light source control circuit 42 computes the gain of the optical amplifier 10' on the basis of the results of detection performed by the PDs 32 and 34, and performs feedback control on the excitation light source 21 so that the gain is substantially maintained at a target gain. That is, the excitation light source control circuit 42 performs automatic gain control (AGC) on the optical amplifier 10'. As a result, even if the wavelength number of input WDM signal light changes, the signal light power per wavelength of WDM signal light output from the output port OUT is substantially maintained at a target value.

FIG. 5B is a graph illustrating an example of the relationship between the wavelength number of input WDM signal light and the output power of the excitation light source 21. In FIG. 5B, in the case of the related art represented by circles, the output power of an excitation light source is set to 24.1 dBm when the wavelength number is 40, decreases with the decrease in the wavelength number, and is set to 14.0 dBm when the wavelength number is 1. On the other hand, in the case of the second embodiment represented by squares in FIG. 5B, like in the case of the related art, the output power of the excitation light source 21 is set to 24.1 dBm when the wavelength number is 40. However, even if the wavelength number decreases, the output power of the excitation light source 21 is only slightly reduced. The output power of the excitation light source 21 is 22.5 dBm when the wavelength number is 1. The reason why the output power of the excitation light source 21 is only slightly reduced with the decrease in the wavelength number is that AGC performed by the excitation light source control circuit 42 compensates for the error of output signal light power caused by the increase in the gain of the first amplification medium 11.

In the optical amplifier 10' according to the second embodiment, even when the wavelength number is small, the excitation light Lp with sufficient power is output from the excitation light source 21, and is then supplied to the first amplification medium 11 via the multiplexer 22. As a result, as represented by squares in FIG. 5C, even when the wavelength number is small, a population inversion factor around the optical input terminal of the first amplification medium 11 is substantially equal to that obtained at the time of the maximum wavelength number. On the other hand, in the case of the related art, as represented by diamonds in FIG. 5C, a population inversion factor is significantly reduced with the decrease in the wavelength number. More specifically, according to the second embodiment, a population inversion factor corresponding to the wavelength number of 1 is improved from 0.907 in the related art to 0.984.

Figure 6A:
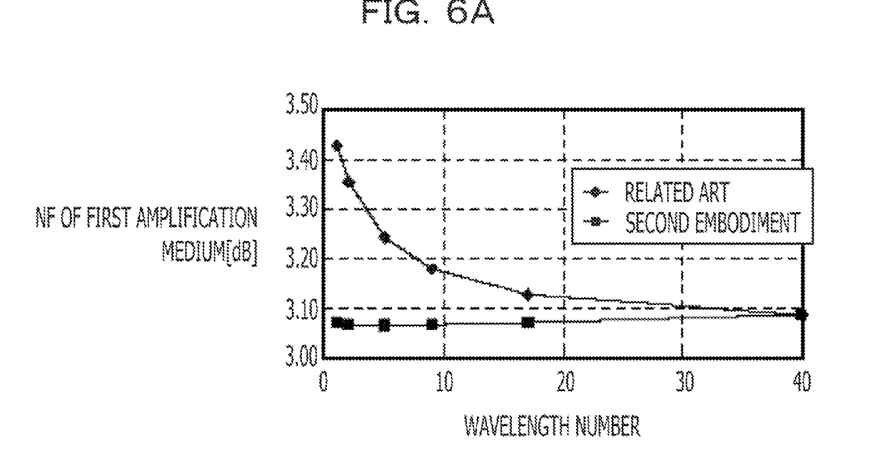
FIG. 6A is a diagram illustrating an example of the NF of a first amplification medium in the optical amplifier illustrated in FIG. 4.
Figure 6B:
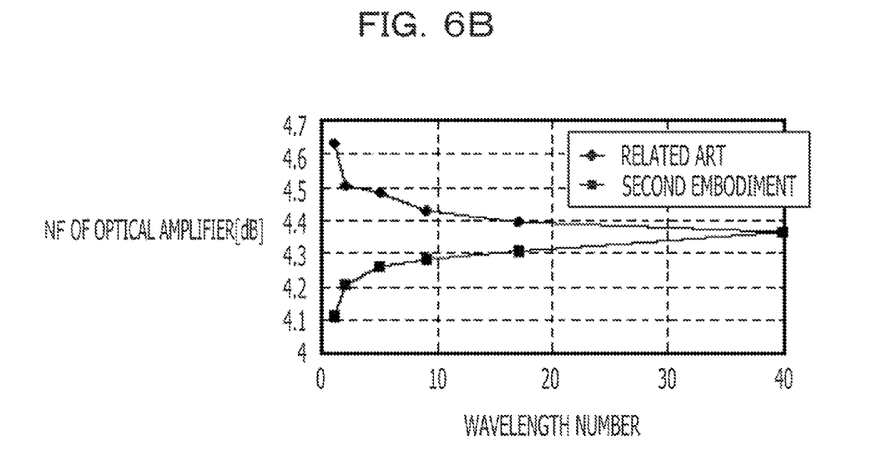
FIG. 6B is a diagram illustrating an example of the NF of the optical amplifier illustrated in FIG. 4.

FIG. 6A is a diagram illustrating an example of the NF of a first amplification medium in the optical amplifier illustrated in FIG. 4. FIG. 6B is a diagram illustrating an example of the NF of the optical amplifier illustrated in FIG. 4. As illustrated in FIG. 6A, in the optical amplifier 10', degradation in the NF of the first amplification medium at the time of a small wavelength number, which occurs in an optical amplifier in the related art, can be effectively reduced. More specifically, according to the second embodiment, when the wavelength number is 1, the NF of the first amplification medium is improved from 3.43 dB in the related art to 3.07 dB that is substantially equal to 3.09 dB obtained when the wavelength number is 40. As illustrated in FIG. 3, when the gain of the first amplification medium 11 is increased, the level of WDM signal light input into the second amplification medium 13 is increased. The NF of the second amplification medium 13 is therefore improved. Accordingly, as illustrated in FIG. 6B, even if the wavelength number decreases, the NF of the optical amplifier 10' is not degraded and is improved to a value smaller than that obtained at the time of the maximum wavelength number. More specifically, when the wavelength number is 1, the NF of the optical amplifier 10' is 4.11 dB and is improved from 4.37 dB obtained when the wavelength number is 40. This means that the synergistic effect of improvements of NFs of the first amplification medium 11 and the second amplification medium 13 is large.

Figure 7:
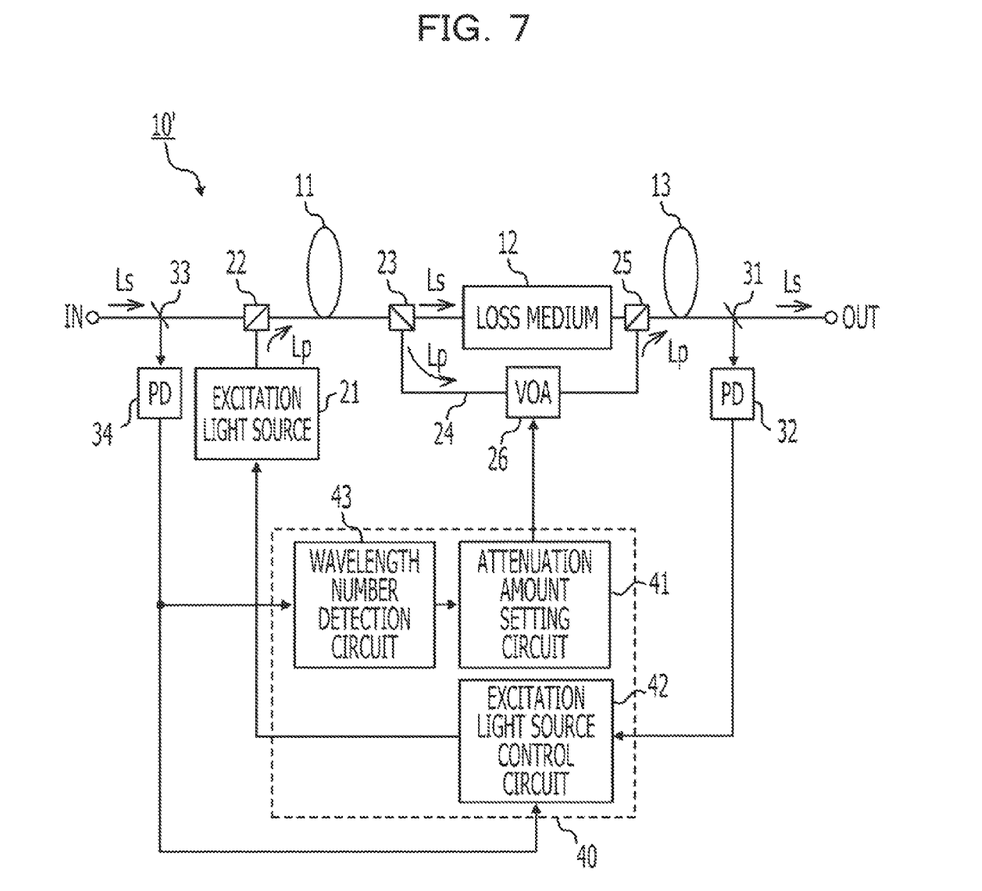
FIG. 7 is a block diagram illustrating another example of an optical amplifier according to the second embodiment.

FIG. 7 is a block diagram illustrating another example of an optical amplifier according to the second embodiment. In the optical amplifier 10' illustrated in FIG. 4, information about the wavelength number of input WDM signal light is supplied to the attenuation amount setting circuit 41 using a supervisory control signal. For example, as illustrated in FIG. 7, a wavelength number detection circuit 43 may detect a wavelength number on the basis of input power detected by the PD 34 and notify the attenuation amount setting circuit 41 of a result of the detection. In this case, in order to detect the wavelength number of input WDM signal light, the wavelength number detection circuit 43 obtains the total power of the input WDM signal light on the basis of a branching ratio set for the branching device 33 and power detected by the PD 34 and divides the total power by a target value of signal light power per wavelength. The optical amplifier 10' having the above-described configuration can acquire the wavelength number information by oneself.

Figure 8:
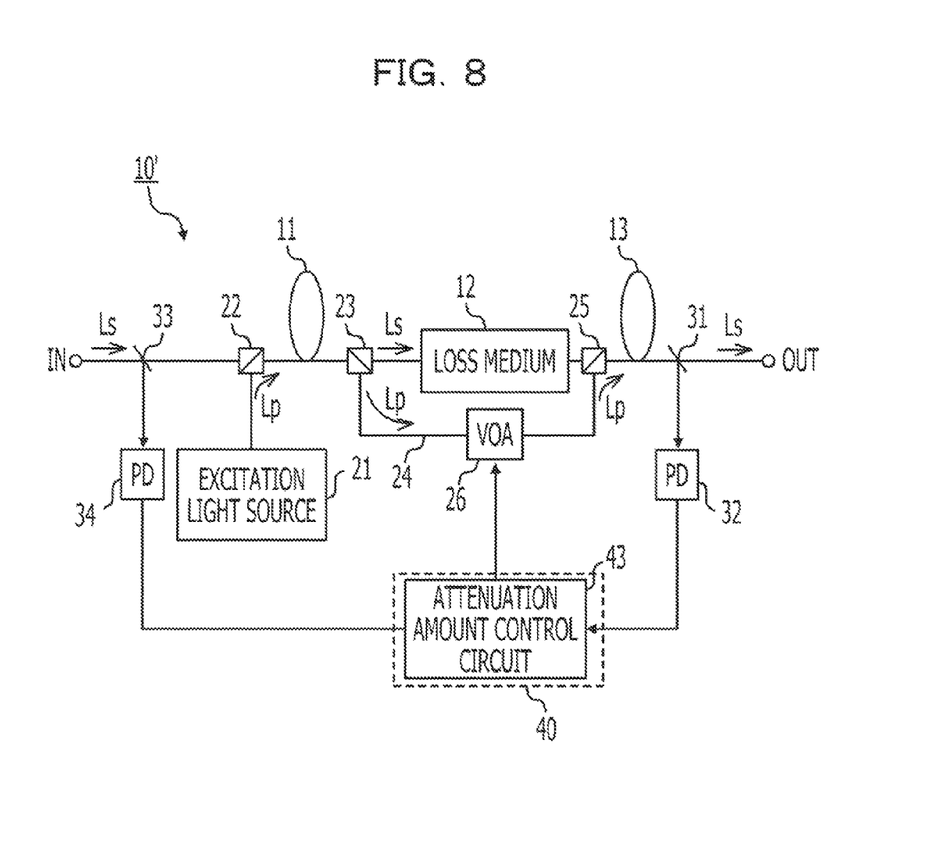
FIG. 8 is a block diagram illustrating another example of an optical amplifier according to the second embodiment.

FIG. 8 is a block diagram illustrating another example of an optical amplifier according to the second embodiment. In the optical amplifier 10' illustrated in FIG. 4, for AGC of the optical amplifier 10', the excitation light source control circuit 42 performs feedback control of the driving state of the excitation light source 21. For example, as illustrated in FIG. 8, for AGC of the optical amplifier 10', feedback control of the amount of attenuation for the VOA 26 may be performed instead of the feedback control of the driving state of the excitation light source 21.

In the optical amplifier 10' illustrated in FIG. 8, the power of the excitation light Lp output from the excitation light source 21 is set so that required excitation light power at the time of the maximum wavelength number is held regardless of the change in the wavelength number of input WDM signal light. An attenuation amount control circuit 43 computes the gain of the optical amplifier 10' on the basis of light power detected by the PD 34 on the input side and light power detected by the PD 32 on the output side, and performs feedback control of the amount of attenuation for the VOA 26 so that the gain is substantially maintained at a target gain set in advance. In the optical amplifier 10' having the above-described configuration, even if the wavelength number of input WDM signal light decreases, an NF does not degrade since the excitation light Lp with substantially constant power is supplied to the first amplification medium 11. Even if the wavelength number of input WDM signal light changes, the signal light power per wavelength of output WDM signal light is substantially maintained at a target value since the attenuation amount control circuit 43 optimizes the amount of attenuation for the VOA 26 in accordance with the wavelength number.

Accordingly, by using the optical amplifier illustrated in FIG. 8, an effect similar to that obtained when the optical amplifier illustrated in FIG. 4 is used can be acquired. In addition, it is possible to simplify the configuration of the optical amplifier 10'. The response speed of the VOA 26 that is feedback-controlled by the attenuation amount control circuit 43 is lower than that of the excitation light source 21 that is feedback-controlled by the excitation light source control circuit 42. Accordingly, it takes a slightly longer time to adjust output signal light power to a target value when the wavelength number changes. When the accuracy of signal light power is important, it is desirable that the optical amplifier illustrated in FIG. 4 or 7 be used.

Figure 9:
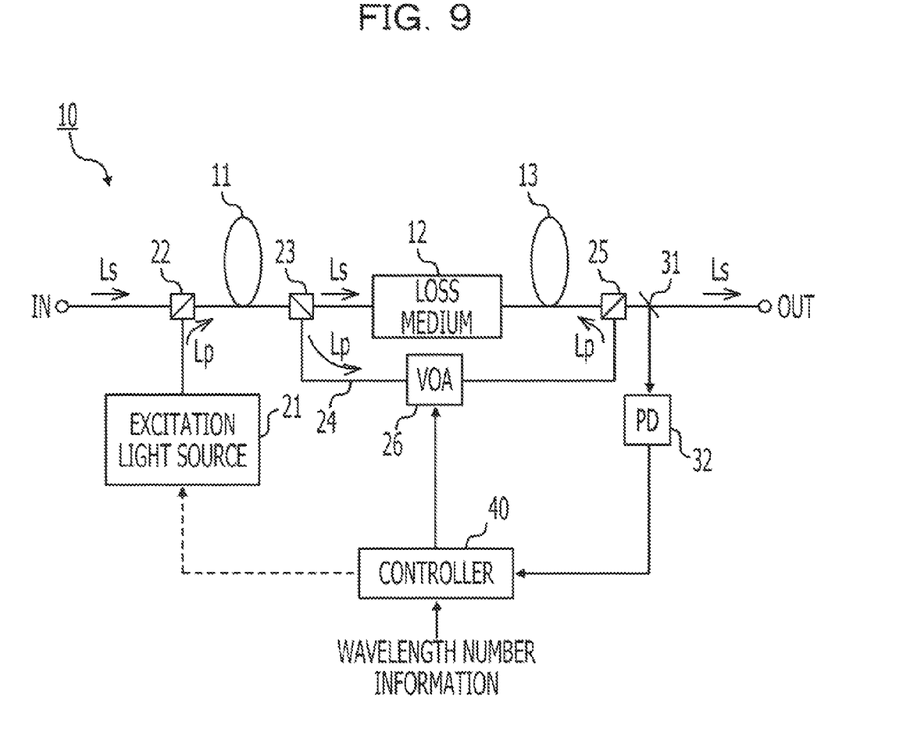
FIG. 9 is a block diagram illustrating another example of an optical amplifier according to the first embodiment.

FIG. 9 is a block diagram illustrating another example of an optical amplifier according to the first embodiment. In the optical amplifiers 10 and 10', the excitation light Lp that has bypassed the loss medium 12 is supplied to one end of the second amplification medium 13 on the side of the loss medium 12. For example, as illustrated in FIG. 9, the multiplexer 25 may be disposed between the second amplification medium 13 and the branching device 31, and excitation light may be supplied to the other end of the second amplification medium 13 on the side of the output port OUT. In this case, an operational effect similar to the above-described operational effect can also be obtained.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. An optical amplifier comprising:
  a light source configured to generate excitation light;
  a first amplification medium configured to receive light obtained by combining wavelength-multiplexed signal light input into an input port and the excitation light;
  a second amplification medium disposed on a signal path between the first amplification medium and an output port of the optical amplifier;
  a loss medium that is optically coupled between the first amplification medium and the second amplification medium and is configured to receive the wavelength-multiplexed signal light separated from light output from the first amplification medium;
  a variable optical attenuator that is optically coupled between the first amplification medium and the second amplification medium, is disposed on an alternative path that bypasses the loss medium, and is configured to receive the excitation light separated from the light output from the first amplification medium;
  a first photodetector configured to detect power of light separated from the wavelength-multiplexed signal light transmitted from the second amplification medium to the output port; and
  a controller configured to set an amount of attenuation for the variable optical attenuator in accordance with a wavelength number of the wavelength-multiplexed signal light input into the input port, and control the amount of attenuation for the variable optical attenuator or output power of the light source on a basis of a result of detection performed by the first photodetector so that signal light power per wavelength of the wavelength-multiplexed signal light to be output from the output port becomes closer to a target value set in advance.

2. The optical amplifier according to claim 1, wherein, when the wavelength number of the wavelength-multiplexed signal light input into the input port is maximum, the controller sets the amount of attenuation for the variable optical attenuator to a minimum value and increases the amount of attenuation for the variable optical attenuator in accordance with a decrease in the wavelength number of wavelength-multiplexed signal light.

3. The optical amplifier according to claim 2, wherein the controller sets the amount of attenuation for the variable optical attenuator to the minimum value before the optical amplifier is operated, stores a relationship between the wavelength number of the wavelength-multiplexed signal light input into the input port and output power of the light source required to set the signal light power per wavelength of the wavelength-multiplexed signal light to be output from the output port to the target value, obtains the output power of the light source corresponding to the wavelength number of the wavelength-multiplexed signal light input into the input port using the stored relationship after the optical amplifier has been operated, calculates a difference value between the obtained output power and output power of the light source obtained when the wavelength number is the maximum, and sets a value obtained by adding the difference value to the minimum value of the amount of attenuation for the variable optical attenuator as the amount of attenuation for the variable optical attenuator during operation.

4. The optical amplifier according to claim 1, further comprising a second photodetector configured to detect power of light separated from the wavelength-multiplexed signal light transmitted from the input port to the first amplification medium, and wherein the controller includes an attenuation amount setting circuit configured to set the amount of attenuation for the variable optical attenuator in accordance with the wavelength number of the wavelength-multiplexed signal light input into the input port and a light source control circuit configured to compute a gain of the optical amplifier on the basis of results of detection performed by the first photodetector and the second photodetector and control a driving state of the light source so that the gain becomes closer to a target gain set in advance.

5. The optical amplifier according to claim 4, wherein the attenuation amount setting circuit determines the wavelength number of the wavelength-multiplexed signal light input into the input port on a basis of wavelength number information externally transmitted to the optical amplifier, and sets the amount of attenuation for the variable optical attenuator in accordance with the wavelength number.

6. The optical amplifier according to claim 4, wherein the controller includes a wavelength number detection circuit configured to detect the wavelength number of the wavelength-multiplexed signal light input into the input port on the basis of a result of detection performed by the second photodetector, and wherein the attenuation amount setting circuit sets the amount of attenuation for the variable optical attenuator in accordance with the wavelength number detected by the wavelength number detection circuit.

7. The optical amplifier according to claim 1, further comprising the second photodetector configured to detect power of light separated from the wavelength-multiplexed signal light transmitted from the input port to the first amplification medium, and wherein the driving state of the light source is set so that output power of the light source becomes substantially constant regardless of a change in the wavelength number of the wavelength-multiplexed signal light input into the input port, and wherein the controller includes an attenuation amount control circuit configured to compute the gain of the optical amplifier on the basis of results of detection performed by the first photodetector and the second photodetector and control the amount of attenuation for the variable optical attenuator so that the gain becomes closer to a target gain set in advance.

8. The optical amplifier according to claim 1, wherein a length of the first amplification medium is shorter than that of the second amplification medium.

9. The optical amplifier according to claim 1, wherein the first amplification medium and the second amplification medium are rare-earth-doped optical fibers or rare-earth-doped optical waveguides.

10. The optical amplifier according to claim 1, wherein the loss medium includes a gain equalizer configured to compensate for wavelength dependence of gains of the first amplification medium and the second amplification medium.

11. The optical amplifier according to claim 1, wherein the loss medium includes a dispersion compensator configured to compensate for dispersion of the wavelength-multiplexed signal light input into the input port.

* * * * *